R. WHIPPLE.
GUARD FOR TRACTOR DRAWN PLOWS.
APPLICATION FILED NOV. 19, 1920.
1,413,641.                                            Patented Apr. 25, 1922.
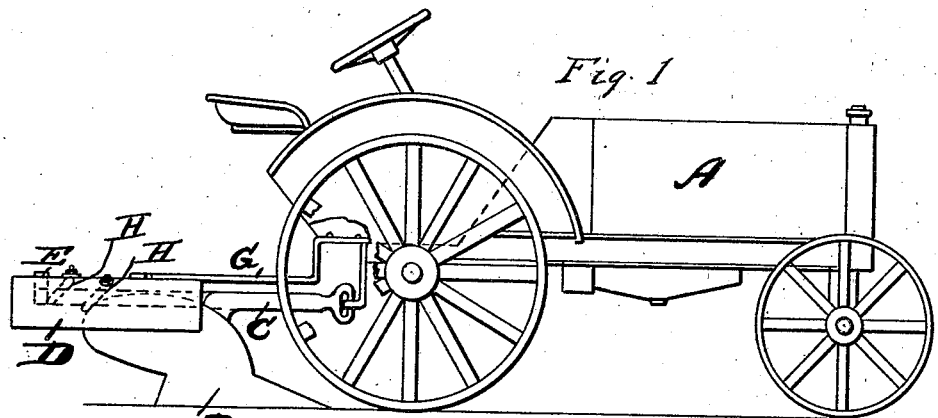
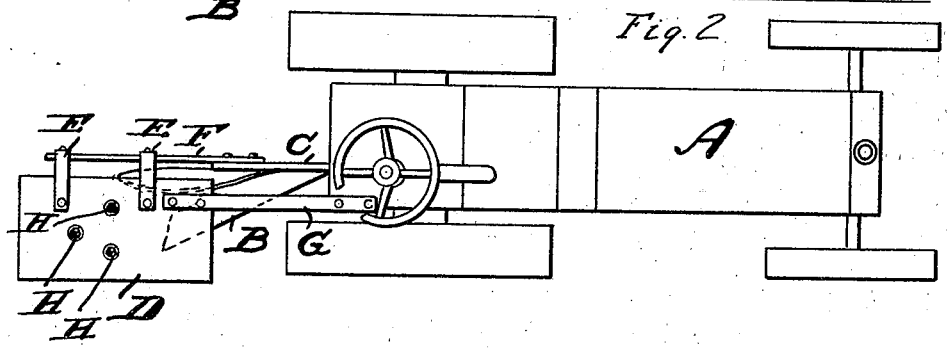
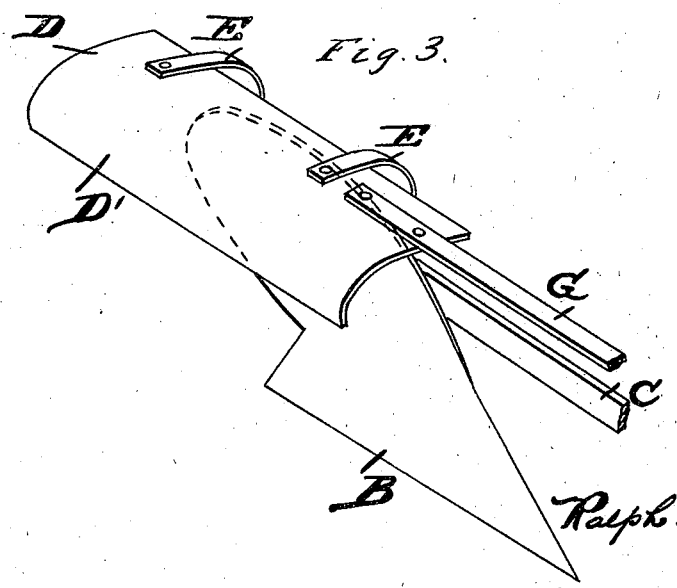
Inventor
Ralph Whipple
By S. E. Thomas
Attorney

UNITED STATES PATENT OFFICE.

RALPH WHIPPLE, OF DETROIT, MICHIGAN, ASSIGNOR OF ONE-HALF TO CARL H. MICHELL, OF DETROIT, MICHIGAN.

GUARD FOR TRACTOR-DRAWN PLOWS.

1,413,641.  Specification of Letters Patent.  Patented Apr. 25, 1922.

Application filed November 19, 1920. Serial No. 425,223.

*To all whom it may concern:*

Be it known that I, RALPH WHIPPLE, citizen of the United States, residing at Detroit, county of Wayne, State of Michigan, have invented a certain new and useful Improvement in Guards for Tractor-Drawn Plows, and declare the following to be a full, clear, and exact description of the same, such as will enable others skilled in the art to which it pertains to make and use the same, reference being had to the accompanying drawings, which form a part of this specification.

My invention relates to a guard for tractor-drawn plows which is adapted to direct the sod cut by the plow into the furrow.

It is well known that when plowing with a tractor,—its speed compared with that of a horse drawn plow results in the sod being thrown from the mold-board laterally and rearwardly to a considerable distance, resulting in much loss of time and labor to place the field in proper condition.

The object therefore of this invention is to provide a soil-guard attachment for an ordinary plow supported by bracket arms secured to a rear extension of the plow beam and by a suitable member extending from the tractor frame,—the construction being such that the sod when it leaves the mold-board of the plow will be intercepted by the soil-guard suspended above and back of the plow and will be directed by it into the furrow regardless of the speed of the tractor.

With the foregoing and other objects in view the invention further consists in the details of construction hereinafter described and claimed.

In the accompanying drawings forming part of this specification:

Figure 1 is a side elevation of a tractor with a plow attached thereto, showing the soil-guard suspended above and back of the plow by members bolted to the tractor frame and to the plow beam.

Figure 2 is a plan view of the same.

Figure 3 is a perspective view of the plow showing the overhanging soil-guard as it would appear supported by brackets from an extension of the plow beam and an arm connected with the tractor frame.

Referring now to the letters of reference placed upon the drawings:

A, indicates a tractor, B denotes a plow, and C the plow-beam coupled to a tractor.

D, denotes a soil-guard supported above the plow by bracket arms E, E, attached to a rear extension F, of the plow beam.

G, indicates a bar bolted to the forward end of the soil-guard adapted to be attached to a suitable member of the tractor frame.

H, are cutters attached to the soil-guard for pulverizing the sod before delivering it into the furrow.

The soil-guard when viewed in cross section is curved downwardly at one side, as indicated at D', to direct the sod into the furrow as it leaves the mold-board of the plow. When plowing with a tractor the sod cut by the plow passes rapidly over the mold-board and is thrown laterally and backwardly from the plow to a considerable distance due to the speed at which it is traveling. The soil-guard therefore, is suspended directly above and beyond the end of the plow in order to intercept the sod as it leaves the mold-board to direct it back into the furrow.

Having thus described my invention what I claim is:

1. A plow having a plow beam, a soil-guard having a downwardly directed outer edge, bracket arm carried by a rear extension of said plow beam for supporting said guard above and back of the plow, whereby the sod cut by the plow will be directed by the guard back into the furrow.

2. A plow having a rear plow beam extension, an overhanging soil-guard located above and back of the mold-board of the plow, bracket arms bolted to said rear plow beam extension and to said soil guard for supporting said guard in position above and back of the mold-board of the plow.

3. In a device of the character described, a tractor, a plow, a rear extension bolted to the plow beam, a soil-guard, bracket arms attached to the soil-guard and to the rear extension of the plow beam, and an arm bolted to the soil-guard and to the tractor frame.

4. In a device of the character described, a tractor, a plow, a rear extension bolted to the plow beam, a soil-guard, means for pulverizing the sod carried by the soil-guard, bracket arms attached to the soil-guard and to the rear extension of the plow beam, and an arm bolted to the soil-guard and to the tractor frame.

5. In a device of the character described, in combination, a tractor frame, having a rearwardly extending bar, a plow, a plow beam therefor coupled to said tractor frame, a rear extension on said plow beam, a soil guard, and means for supporting said soil guard by said rear extending bar and said plow beam extension.

6. In a device of this character described in combination, a tractor frame having a rearwardly extending bar, a plow, a plow beam therefor coupled to said tractor frame, a rear extension on said tractor frame, a rear extension on said plow beam, a soil guard, means for attaching the forward end of said soil guard to said rearwardly extending bar, and brackets connected respectively with the sides of said soil guard and with said plow beam extension.

In testimony whereof, I sign this specification in the presence of two witnesses.

RALPH WHIPPLE.

Witnesses:
S. E. THOMAS,
JOHN CONSIDINE, Jr.